United States Patent [19]

Namioka

[11] Patent Number: 5,117,937
[45] Date of Patent: Jun. 2, 1992

[54] TRANSFER DEVICE FOR FOUR WHEEL DRIVE MOTOR VEHICLE

[75] Inventor: Sadao Namioka, Kanagawa, Japan

[73] Assignee: Nissan Motor Co., Ltd., Yokohama, Japan

[21] Appl. No.: 683,698

[22] Filed: Apr. 11, 1991

[30] Foreign Application Priority Data

May 18, 1990 [JP] Japan .................. 2-128687

[51] Int. Cl.⁵ .......................................... B60K 17/344
[52] U.S. Cl. ....................... 180/248; 180/247; 74/665 T
[58] Field of Search ............... 180/248, 247, 249, 233; 74/665 T

[56] References Cited

FOREIGN PATENT DOCUMENTS

| | | | |
|---|---|---|---|
| 75836 | 4/1984 | Japan | 180/248 |
| 13822 | 1/1988 | Japan | 180/248 |
| 1-103540 | 4/1989 | Japan | |
| 254027 | 10/1990 | Japan | 180/248 |

*Primary Examiner*—Robert P. Olszewski
*Assistant Examiner*—Kenneth Noland
*Attorney, Agent, or Firm*—Foley & Lardner

[57] ABSTRACT

A transfer device for a four wheel drive motor vehicle is disclosed, which comprises an input shaft; a rear wheel output shaft arranged coaxial with the input shaft; a front wheel output shaft arranged in parallel with the input shaft; a center differential for distributing torque, applied thereto from the input shaft, to both the rear and front wheel output shafts through rear and front torque transmitting ways respectively; a differential control device operatively interposed between the rear and front torque transmitting ways to control a slip which may occur between the rear and front wheel output shafts; and a torque transmitting mechanism for transmitting the distributed torque from the center differential to the front wheel output shaft, wherein the center differential, the torque transmitting mechanism and the differential control device are supported by and aligned along the rear wheel output shaft in this order, and the rear wheel output shaft is supported by a bearing at a position between the torque transmitting mechanism and the differential control device.

13 Claims, 2 Drawing Sheets

TRANSFER DEVICE FOR FOUR WHEEL DRIVE MOTOR VEHICLE

BACKGROUND OF THE INVENTION

1. Field of the Invention

The present invention relates in general to transfer devices for four wheel drive motor vehicles, and more particularly to transfer devices of a type in which a front wheel output shaft and a rear wheel output shaft are arranged in parallel with each other.

2. Description of the Prior Art

In order to clarify the task of the present invention, one conventional transfer device of the above-mentioned type will be described, which is disclosed in Japanese Patent First Provisional Publication No. 1-103540.

An engine torque outputted from a transmission is inputted to a center differential through an auxiliary transmission which can selectively assume low and high speed stages. At the center differential, the torque is distributed to front and rear wheel driving systems.

The auxiliary transmission is a planetary gear set which includes a sun gear, a pinion gear and a ring gear. A pinion carrier is used as output means for outputting the driving force which has been subjected to a speed change, and the sun gear or the pinion carrier is used as input means for inputting the driving force. Switching to the sun gear or the pinion carrier is carried out by a switch device.

The switch device comprises generally a sleeve which is axially movably splined to a hub formed about the input shaft. That is, by axially shifting the sleeve on the hub, the engagement of the sun gear or the pinion carrier is effected.

The center differential is a planetary gear set which comprises a sun gear, a pinion gear and a ring gear. The torque outputted from the auxiliary transmission is inputted to the pinion gear of the center differential through a pinion carrier, so that the torque for the front wheels is inputted to the sun gear and the torque for the rear wheels is inputted to the ring gear.

An output shaft for the rear wheels is arranged coaxial with a rotation axis of the center differential, and the output shaft for the front wheels is arranged in parallel with the rotation axis of the center differential. The output shaft for the rear wheels is united with the ring gear of the center differential, and the output shaft for the front wheels is connected to a differential switch device through a torque transmitting mechanism which includes a sprocket and a chain.

The differential switch device is so designed as to selectively engage or disengage the sun gear of the center differential, the ring gear of the same and the sprocket of the torque transmitting mechanism. That is, when the sun gear and the ring gear are engaged, the center differential becomes locked thereby to deliver the engine torque to only the rear wheel driving system, while, when the sun gear, the ring gear and the sprocket are engaged, the engine torque is distributed to both the front and rear wheel driving systems keeping the center differential locked. When the sun gear and the sprocket are engaged, the front and rear wheel driving systems are applied with torque which is provided by the differential function of the center differential.

The torque transmitting mechanism, the differential switch device and the center differential are supported by a common supporting shaft.

However, due to its inherent construction, the above-mentioned conventional transfer device has the following drawback.

That is, because the torque transmission mechanism, the differential switch device and the center differential are supported by the common supporting shaft, the length between bearings on the common supporting shaft is inevitably increased. Thus, the resonance point of the entire of the transfer device is shifted toward a lower frequency side, and thus it tends to occur that the transfer device is subjected to resonance even when the associated engine operates at normal operating speeds.

This phenomenon gives the vehicle passengers uncomfortable riding feeling.

SUMMARY OF THE INVENTION

It is therefore an object of the present invention to provide a transfer device for a four wheel drive motor vehicle, which is free of the above-mentioned drawback.

According to the present invention, there is provided a transfer device in which a measure is employed for reducing the length or span between bearings on a supporting shaft of a center differential.

According to the present invention, there is a transfer device for a four wheel drive motor vehicle, which comprises an input shaft; a rear wheel output shaft arranged coaxial with the input shaft; a front wheel output shaft arranged in parallel with the input shaft; a center differential for distributing torque, applied thereto from the input shaft, to both the rear and front wheel output shafts through rear and front torque transmitting ways respectively; a differential control device operatively interposed between the rear and front torque transmitting ways to control a slip which may occur between the rear and front wheel output shafts; and a torque transmitting mechanism for transmitting the distributed torque from the center differential to the front wheel output shaft, wherein the center differentical, the torque transmitting mechanism and the differential control device are supported by and aligned along the rear wheel output shaft in this order, and the rear wheel output shaft is supported by a bearing at a position between the torque transmitting mechanism and the differential control device.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 2:
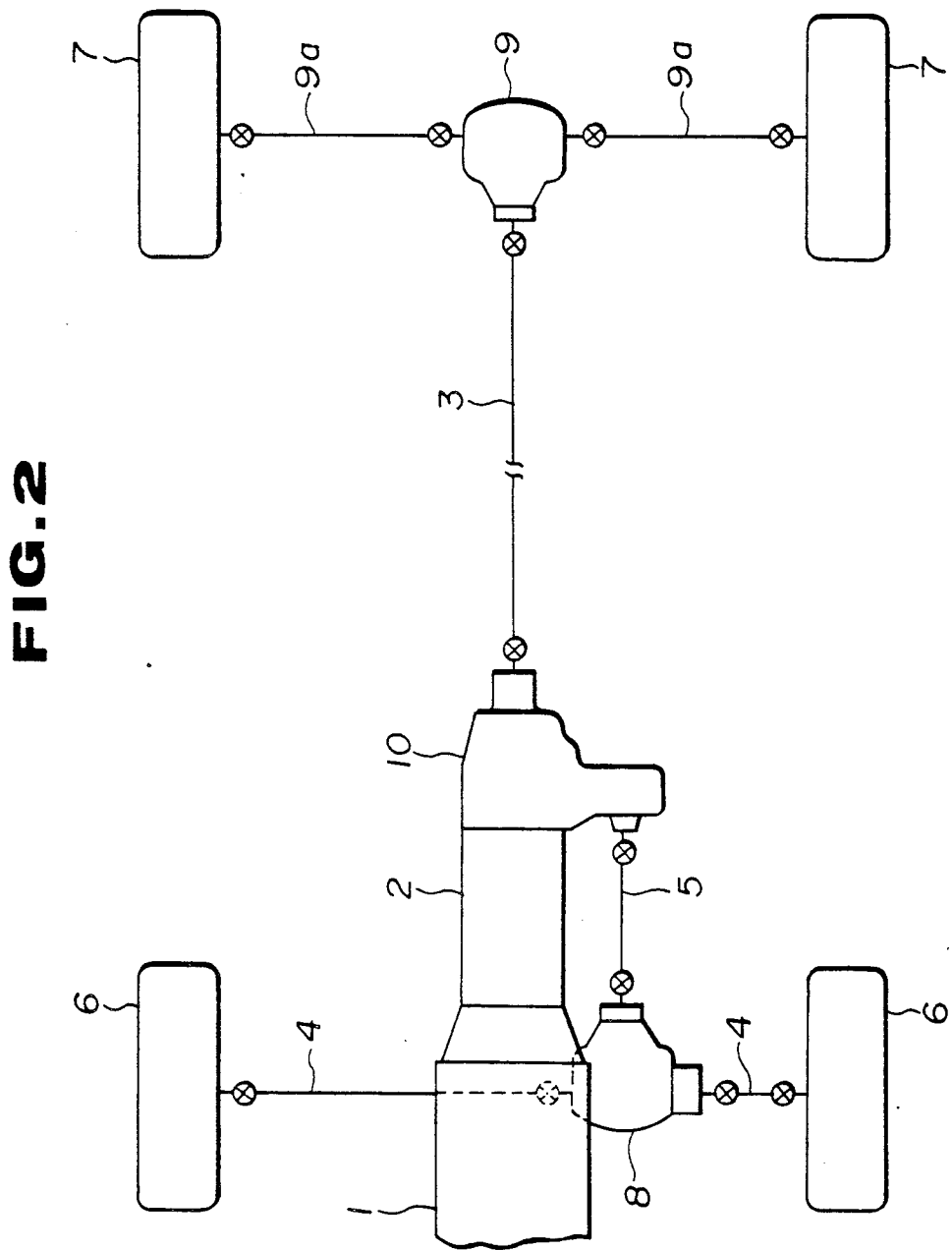
FIG. 2 is a schematically illustrated view of a four wheel drive motor vehicle to which the transfer device of the invention is practically applied.

Referring to FIG. 2, there is shown schematically a driving system of a four wheel drive motor vehicle, to which a transfer device 10 of the present invention is practically applied.

As shown, in this driving system, an engine 1, a main transmission 2 and the transfer device 10 are aligned along an axial direction of the associated motor vehicle body.

Between front wheels 6 and 6, and between rear wheels 7 and 7, there are arranged front and rear differentials 8 and 9 respectively. A propeller shaft 5 extends between the transfer device 10 and the front differential 8 to effect a power transmission to the front differential 8, and another propeller shaft 3 extends between the transfer device 10 and the rear differential 9 to effect a power transmission to the rear differential 9.

The front wheels 6 and 6 are connected to the front differential 8 through respective axles 4 and 4, and the rear wheels 7 and 7 are connected to the rear differential 9 through respective axles 9a and 9a.

Figure 1:
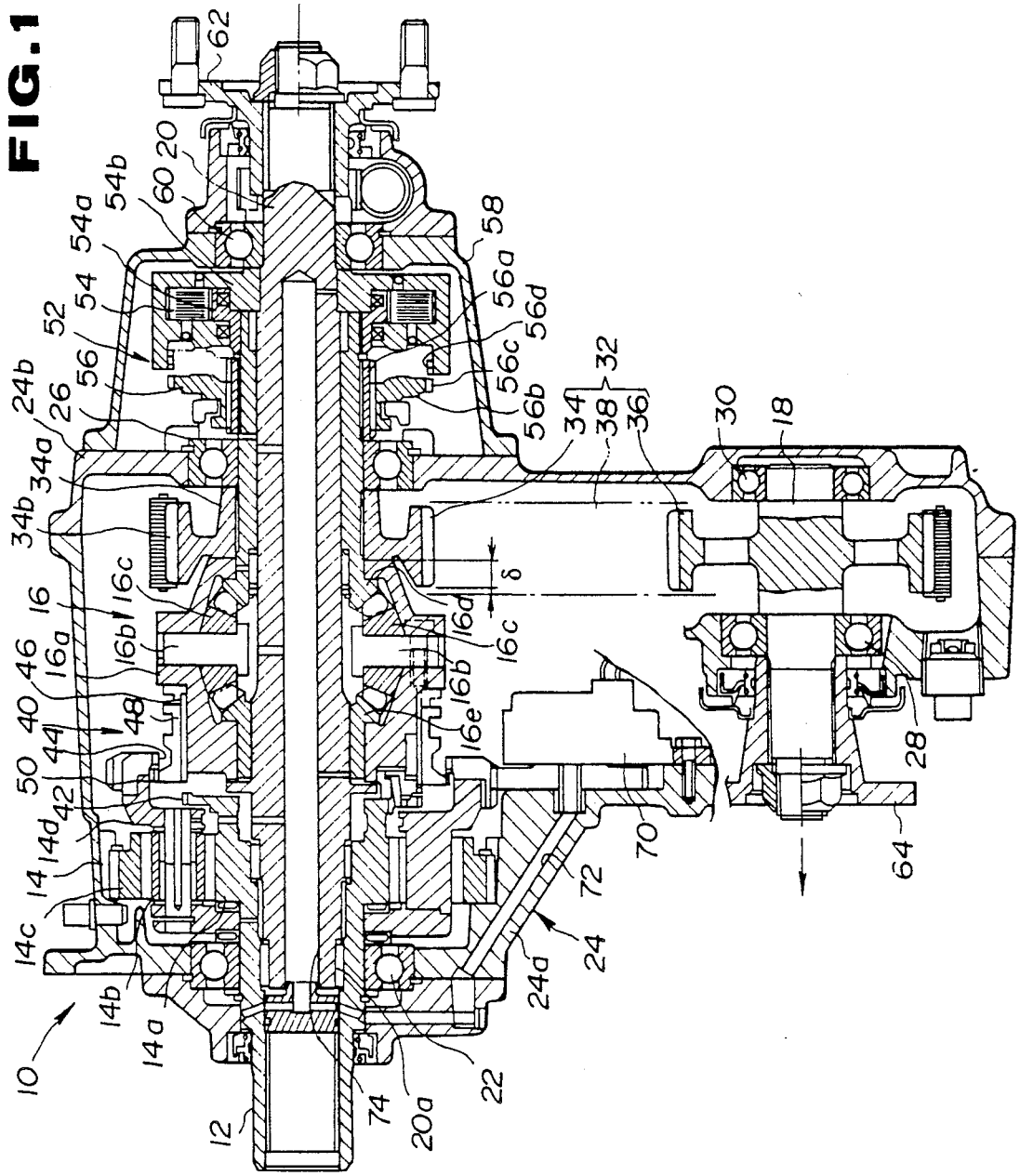
FIG. 1 is a sectional view of a transfer device for a four wheel drive motor vehicle, which is an embodiment of the present invention.

The transfer device 10 of the invention is clearly shown in FIG. 1.

Although not shown in the drawing, the main transmission 1 is arranged in a left side of the drawing. The engine torque from the main transmission 1 is inputted to a hollow input shaft 12 of the transfer device 10. The torque fed to this input shaft 12 is inputted to a center differential 16 through an auxiliary transmission 14 which can selectively assume low and high speed stages.

The center differential 16 functions to distribute the torque applied thereto to both front and rear wheel output shafts 18 and 20.

The rear wheel output shaft 20 extends axially and passes through a center of the center differential 16. One end (viz., the left end as viewed in the drawing) of the shaft 20 is received in the hollow input shaft 12 and rotatably supported by the same through a needle bearing 20a. The input shaft 12 is in turn rotatably supported by a housing proper 24a of a housing 24 of the transfer device 10 through a ball bearing 22.

The auxiliary transmission 14 is a planetary gear set which comprises a sun gear 14a integral with the input shaft 12, pinion gears 14b meshed with the sun gear 14a and a ring gear 14c coaxially surrounding the sun gear 14a with an interposal of the pinion gears 14b therebetween.

The pinion gears 14b are supported by a pinion carrier 14d, and the ring gear 14c is connected to the housing proper 24a in a manner to be prevented from rotation relative to the housing proper 24a.

The center differential is a so-called "differential gear device" which comprises a differential case 16a, pinion mate shafts 16b arranged to extend perpendicular to the rotation axis of the differential case 16a, pinion mate gears 16c rotatably supported by the pinion mate shafts 16b, and a pair of side gears 16d and 16e which are meshed with the pinion mate gears 16c from diametrically opposed sides.

Each side gear 16d or 16e is integrally formed with a cylindrical hollow extension part which is coaxially disposed about the rear wheel output shaft 20. That is, the side gear 16d is rotatably disposed at the cylindrical hollow part thereof about the rear wheel output shaft 20, while the other side gear 16e is splined at the cylindrical hollow part thereof to the rear wheel output shaft 20 to rotate therewith. Thus, rotation of the side gear 16e is transmitted to the rear wheel output shaft 20.

The differential case 16a is rotatably disposed about the respective cylindrical hollow parts of the two side gears 16d and 16e.

Disposed about the cylindrical hollow part of the side gear 16d is a ball bearing 26 which is fitted in a bore (no numeral) formed in a cover 24b of the housing 24. Thus, a middle part of the rear wheel output shaft 20 is supported by the cover 24b through the ball bearing 26. More specifically, the rear wheel output shaft 20 is supported by the housing 24 through the two bearings 22 and 26. In other words, the rear wheel output shaft 20 serves as a supporting means for the center differential 16.

The front wheel output shaft 18 is arranged in parallel with the rear wheel output shaft 20 and rotatably supported by the housing proper 24a and the cover 24b through respective ball bearings 28 and 30.

Between the side gear 16d and the front wheel output shaft 18, there is arranged a so-called "torque transmitting mechanism" 32 which includes first and second sprockets 34 and 36 and a chain 38.

The first sprocket 34 is splined to the cylindrical hollow part of the side gear 16d between the center differential 16 and the ball bearing 26. The second sprocket 36 is integral with the front wheel output shaft 18. The chain 38 is put around the first and second sprocket 34 and 36 to transmit rotation of the side gear 16d to the front wheel output shaft 18.

As is seen from the drawing (viz., FIG. 1), the first sprocket 34 comprises a hub part 34a directly splined to the cylindrical hollow part of the side gear 16d, a toothed outer cylindrical part 34b and a thinner wall part (no numeral) which is interposed between the two parts 34a and 34b. The toothed outer cylindrical part 34b is somewhat projected toward the center differential 16. As shown, the edge part of the toothed outer cylindrical part 34b at the side of the center differential 16 is arranged about the outer surface of the differential case 16a of the center differential 16 in a manner to be somewhat offset from the same (offset degree=δ).

Between the auxiliary transmission 14 and the differential case 16a of the center differential 16, there is arranged a switch device 40 which actuates the auxiliary transmission 14 to switch between the low and high speed stages.

The switch device 40 comprises a first clutch toothed part 42 which coaxially inwardly extends from the sun gear 14a of the auxiliary transmission 14, a second clutch toothed part 44 which coaxially extends from the carrier 14d, splines 46 formed about the outer surface of the differential case 16a of the center differential 16, an inwardly splined sleeve 48 axially slidably engaged with the splines 46 and a third clutch toothed part 50 which coaxially extends from the sleeve 48.

As shown, the second clutch toothed part 44 is arranged to coaxially surround an axial edge part of the differential case 16a of the center differential 16.

The first clutch toothed part 42 is shaped to have the same diameter as the splined part 46 of the differential case 16a and thus the part 42 is lockably engageable with the inwardly splined sleeve 48. The second clutch toothed part 44 is shaped to be lockably engageable with the third clutch toothed part 50.

Accordingly, when the sleeve 48 assumes the illustrated position wherein the sleeve 48 is not engaged with the first clutch toothed part 42 and the second clutch toothed part 44, a neutral condition is established of the switch device 40. Under this condition, power transmission toward the center differential 16 is not carried out.

When the sleeve 48 is moved leftward from the illustrated neutral position to establish a meshed engagement between the sleeve 48 and the first clutch toothed part 42, the power of the input shaft 12 is directly transmitted to the differential case 16a. Under this condition, high speed gear stage is established by the auxiliary transmission 14.

When the sleeve 48 is moved rightward from the illustrated neutral position to establish a meshed engagement between the third clutch toothed part 50 of the sleeve 48 and the second clutch toothed part 44, the power of the input shaft 12 is transmitted through the pinion carrier 14d to the differential case 16a. Under this condition, low speed gear stage is established by the auxiliary transmission 14.

The rear wheel output shaft 20 and the cylindrical hollow part of the side gear 16d are both projected rearward (viz., toward the rear of the vehicle) from the cover 24b of the housing 24. Between the projected portions of the rear wheel output shaft 20 and the cylindrical hollow part of the side gear 16d, there is arranged a differential control device 52.

The differential control device 52 comprises generally a viscous coupling 54 and a clutch 56. An inner race 54a of the viscous coupling 54 is splined to an outer surface of the cylindrical hollow part of the side gear 16d, and an outer race 54b of the viscous coupling 54 is splined to an outer surface of the projected rear wheel output shaft 20.

The clutch 56 comprises a hub 56a which is splined to the outer surface of the cylindrical hollow part of the side gear 16d and has splines formed thereabout, a sleeve 56b which is axially movably splined to the hub 56a, a clutch toothed part 56c which is formed about the sleeve 56b, and a clutch toothed part 56d which is formed on the outer race 54b and lockably engageable with the clutch toothed part 56c.

When the sleeve 56b assume the illustrated position wherein the clutch toothed part 56c is disengaged from the clutch toothed part 56d, the connection between the rear wheel output shaft 20 and the side gear 16d is made through both the center differential 16 and the viscous coupling 54. Thus, under this condition, slip control function is carried out by the viscous coupling 54.

When the sleeve 56b is moved rightward in the drawing to establish a meshed engagement between the clutch toothed parts 56c and 56d, the viscous coupling 54 becomes locked causing an integral rotation of the rear wheel output shaft 20 and the side gear 16d. Under this condition, identical torque is distributed to both the front and rear wheel driving systems.

As is seen from FIG. 1, the differential control device 52 is installed in an auxiliary housing 58 which is detachably connected to the cover 24b of the housing 24 through bolts (not shown). The rear wheel output shaft 20 has a rear end portion projected rearward from the auxiliary housing 58. The projected rear end portion of the shaft 20 is rotatably supported by the auxiliary housing 58 through a ball bearing 60.

The rear end of the rear wheel output shaft 20 and the front end of the front wheel output shaft 18 are provided with respective flanges 62 and 64 to which the rear and front propeller shafts 3 and 5 (see FIG. 2) are secured.

Designated by numeral 70 is an oil pump. A lubrication oil sucked into the pump 70 is supplied, through a passage 72a formed in a thicker part of the housing proper 24a of the housing 24 and a passage 72b formed in the cover 24c, to an axially extending bore 74 of the rear wheel output shaft 20, and then the lubrication oil is delivered to various portions where lubrication is needed.

The engine torque applied to the differential case 16a of the center differential 16 from the input shaft 12 through the auxiliary transmission 14 and the switch device 40 is subjected to a torque distribution at the center differential 16, so that one part of the torque is inputted to the front wheel output shaft 18 through the side gear 16d and the torque transmitting mechanism 32 and the other part of the torque is inputted to the rear wheel output shaft 20 through the other side gear 16e.

Under this condition, by operating the switch device 40, the high speed gear stage or the low speed gear stage of the auxiliary transmission 14 can be selected, furthermore, by operating the clutch 56 of the differential control device 52 in the auxiliary housing 58, either one of the locked and unlocked conditions of the viscous coupling 54 can be selected.

The torque delivered to the front wheel output shaft 18 is transmitted through the front propeller shaft 5 (see FIG. 2) and front front differential 8 to the front right and left road wheels 6 and 6.

The other torque delivered to the rear wheel output shaft 20 is transmitted through the rear propeller shaft 3 (see FIG. 2) and the rear differential 9 to the rear right and left road wheels 7 and 7.

In the following, advantageous constructional features of the present invention will be described.

In the invention, along the rear wheel output shaft 20 which supports the center differential 26, there are aligned the center differential 16, the torque transmitting mechanism 32 and the differential control device 52 in this order, and between the torque transmitting mechanism 32 and the differential control device 52, there is arranged the ball bearing 26, which indirectly supports the rear wheel output shaft 20. That is, the differential control device 52 is located away from a zone where a load applied to the shaft 20 is substantially supported by both the ball bearings 22 and 26. This means that the distance or span between the two ball bearings 22 and 26 can be reduced in the invention. Thus, the manner in which the rear wheel output shaft 20 is supported by the housing 24 is assured or improved, so that the resonance point of the shaft 20 is shifted to a higher frequency side. Thus, undesired resonance of the shaft 20 at the normal speed operation range of the engine is suppressed or at least minimized.

Furthermore, in the invention, the toothed part 34b of the first sprocket 34 of the torque transmitting mechanism 32 is offset from the differential case 16a of the center differential 16. This promotes the reduction of the distance between the two ball bearings 22 and 26.

The differential control device 52 is mounted outside of the main housing 24 and housed in the auxiliary housing 58 which is detachably connected to the main housing 24. Thus, replacement of the device 52 is easily made. That is, although, in the disclosed embodiment, the viscous coupling 54 is employed as a part of the differential control device 52, a multiplate type coupling may be also used in the invention.

What is claimed is:

1. A transfer device for a four wheel drive motor vehicle, comprising:
   an input shaft;
   a rear wheel output shaft arranged coaxial with said input shaft;

a front wheel output shaft arranged in parallel with said input shaft;

a center differential for distributing torque, applied thereto from said input shaft, to both said rear and front wheel output shafts through rear and front torque transmitting ways respectively;

a differential control device operatively interposed between said rear and front torque transmitting ways to control a slip which may occur between said rear and front wheel output shafts; and a torque transmitting mechanism for transmitting the distributed torque from said center differential to said front wheel output shaft, wherein said center differentical, said torque transmitting mechanism and said differential control device are supported by and aligned along said rear wheel output shaft in this order, and said rear wheel output shaft is supported by a bearing at a position between said torque transmitting mechanism and said differential control device.

2. A transfer device as claimed in claim 1, in which said center differential and said torque transmitting mechanism are installed in a main housing and said differential control device is installed in an auxiliary housing which is detachably connected to said main housing.

3. A transfer device as claimed in claim 2, in which said center differential comprises:

a differentical case rotatable about said rear wheel output shaft;

pinion mate shafts extending perpendicular to a rotation axis of said differentical case;

pinion mate gears rotatably supported by said pinion mate shafts; and first and second side gears which are meshed with said pinion mate gears from diametrically opposed sides.

4. A transfer device as claimed in claim 3, in which said torque transmitting mechanism comprises:

a cylindrical hollow part of said first side gear of said center differential;

a first sprocket splined to said cylindrical hollow part to rotate therewith;

a second sprocket coaxially provided on said front wheel output shaft; and a chain put around said first and second sprockets to transmit rotation of said cylindrical hollow part to said front wheel output shaft.

5. A transfer device as claimed in claim 4, in which said differential control device comprises:

a viscous coupling operatively disposed between said first side gear and said rear wheel output shaft; and a clutch operatively disposed between an input part of said viscous coupling and said first side gear in order to selectively connect therebetween.

6. A transfer device as claimed in claim 5, in which said rear torque transmitting way comprises a cylindrical hollow part of said second side gear of said center differentical, said cylindrical hollow part of said second side gear being splined to said rear wheel output shaft to rotate therewith.

7. A transfer device as claimed in claim 2, further comprising:

an auxiliary transmission housed in said main housing, said auxiliary transmission having low and high speed gear stages; and a switch device housed in said main housing at a position between said auxiliary transmission and said center differential, said switch device being cable of connecting said auxiliary transmission and said center differential while keeping one of said low and high speed gear stages.

8. A transfer device as claimed in claim 7, in which said auxiliary transmission is a planetary gearset which comprises:

a sun gear integral with said input shaft;

pinion gears meshed with said sun gear;

a ring gear held by said main housing and coaxially surrounding said sun gear with an interposal of said pinion gears therebetween; and a carrier carrying said pinion gears.

9. A transfer device as claimed in claim 8, in which said switch device comprises:

a first clutch toothed part which extends from said sun gear;

a second clutch toothed part which extends from said carrier, said second clutch toothed part having a diameter larger than that of said first clutch toothed part;

spline means formed about an outer surface of a differential case of said center differential; and an inwardly splined sleeve axially slidably engaged with said spline means of said differential case;

wherein said sleeve is slidable between a first position wherein said sleeve is engaged with said first clutch toothed part thereby to establish said high speed gear stage and a second position wherein said sleeve is engaged with said second clutch toothed part thereby to establish said low speed gear stage.

10. A transfer device as claimed in claim 9, in which the engagement between said sleeve and said first clutch toothed part is established by engaging the inward splines of said sleeve with said first clutch toothed part.

11. A transfer device as claimed in claim 10, in which said switch device further comprises a third clutch toothed part which extends from said sleeve, and in which the engagement between said sleeve and said second clutch toothed part is established by engaging the third clutch toothed part with said second clutch toothed part.

12. A transfer device as claimed in claim 11, in which said second clutch toothed part is arranged to coaxially surround said differential case with said sleeve coaxially disposed therebetween.

13. A transfer device as claimed in claim 12, in which said first clutch toothed part has the same diameter as the spline means of the outer surface of said differential case of said center differential.

* * * * *